United States Patent [19]

Piejko et al.

[11] Patent Number: 5,196,466
[45] Date of Patent: Mar. 23, 1993

[54] POLYMER MIXTURES HAVING IMPROVED THERMOSTABILITY II

[75] Inventors: Karl-Erwin Piejko, Bergisch Gladbach; Hans-Eberhard Braese; Holger Lütjens, both of Cologne, all of Fed. Rep. of Germany

[73] Assignee: Bayer Aktiengesellschaft, Leverkusen-Bayerwerk, Fed. Rep. of Germany

[21] Appl. No.: 755,737

[22] Filed: Sep. 6, 1991

[30] Foreign Application Priority Data

Sep. 18, 1990 [DE] Fed. Rep. of Germany ....... 4029536

[51] Int. Cl.$^5$ .............................................. C08K 5/15
[52] U.S. Cl. .................................................. 524/109
[58] Field of Search ....................... 524/109, 151, 128; 549/218

[56] References Cited

U.S. PATENT DOCUMENTS

| | | | |
|---|---|---|---|
| 3,209,013 | 9/1965 | Hechenbleikner et al. | 524/567 |
| 3,356,770 | 12/1967 | Larrison | 524/128 |
| 3,694,395 | 9/1972 | Stratford et al. | 524/128 |
| 3,794,629 | 2/1974 | Eimers et al. | 524/109 |
| 4,073,769 | 2/1978 | Eimers et al. | 524/109 |
| 4,225,483 | 9/1980 | Eimers et al. | 524/109 |
| 4,341,721 | 7/1982 | Batorewicz | 524/128 |
| 5,047,473 | 9/1991 | Piejko et al. | 524/501 |

FOREIGN PATENT DOCUMENTS

| | | |
|---|---|---|
| 0245792 | 11/1987 | European Pat. Off. . |
| 3743489 | 7/1989 | Fed. Rep. of Germany . |
| 3811899 | 10/1989 | Fed. Rep. of Germany . |
| 3841669 | 6/1990 | Fed. Rep. of Germany . |
| 3918405 | 12/1990 | Fed. Rep. of Germany . |

*Primary Examiner*—Veronica P. Hoke
*Attorney, Agent, or Firm*—Connolly & Hutz

[57] ABSTRACT

Polymer mixtures of acrylate graft rubbers, certain special acrylate copolymers and optionally resinous vinyl polymers, containing special oxetanyl group-containing phosphites, have improved thermostability and are suitable inter alia for the fabrication of films.

2 Claims, No Drawings

POLYMER MIXTURES HAVING IMPROVED THERMOSTABILITY II

This invention relates to polymer mixtures of acrylate graft rubbers, certain special acrylate copolymers and optionally resinous vinyl polymers, containing special oxetanyl group-containing phosphites.

Polymer mixtures of acrylate graft rubbers, certain special acrylate copolymers and optionally resinous vinyl polymers suitable for the production of flexible, age-resistant films having a leather-like appearance and processible by calendering and deep drawing are described in Offenlegungsschriften DE 38 11 899 and 37 43 489.

As disclosed in DE 38 11 899, such polymer mixtures comprise:
a) from 10–60 parts by weight, in particular from 20–50 parts by weight, of a graft polymer comprising:
   a1. mixtures of from 20–40% by weight of acrylonitrile and 80–60% by weight of styrene, α-methylstyrene, alkylmethacrylate or mixtures thereof, or
   a2. methylmethacrylate, optionally mixed with up to 30% by weight of styrene, acrylonitrile and/or alkylacrylate, on
   a3. a particulate, highly cross-linked alkylacrylate rubber with an average particle diameter ($d_{50}$) of from 100 to 800 nm which may contain up to 30% by weight of dienes, the graft polymers (a) having rubber contents of from 30–70% by weight, preferably from 45–65% by weight, most preferably from 50–60% by weight;
b) from 10–50 parts by weight, in particular from 10–40 parts by weight, of an at least partially cross-linked rubber-like copolymer of from 5–40% by weight of acrylonitrile, styrene, alkylmethacrylate or mixtures thereof and from 95–60% by weight of alkylacrylate and small amounts of a cross-linking monomer having a gel content of from 20–99% by weight, a swelling index above 10 determined in dimethylformamide at 23° C. and an average particle diameter ($d_{50}$) of from 100–600 nm, in particular from 100–300 nm;
c) from 5–80, preferably from 5–60, most preferably from 10–49, parts by weight of an uncross-linked polymer of styrenes, α-methylstyrenes, acrylonitrile, methacrylonitrile, esters of (meth)acrylic acid, vinyl $C_1$-$C_4$-carboxylic acids or mixtures of these monomers having Staudinger indices of from 0.3 to 1.5 dl/g (determined in toluene at 23° C.); and
d) from 0–30, in particular from 5–25, parts by weight of a graft polymer comprising:
   d1. methylmethacrylate and optionally up to 30% by weight of styrene, acrylonitrile and/or alkylacrylate, or
   d2. a mixture of from 20–35% by weight of acrylonitrile and from 80–65% by weight of styrene, α-methylstyrene, alkylmethacrylate or mixtures thereof, on
   d3. a particulate, highly cross-linked alkylacrylate rubber which may contain up to 30% by weight of diene and has an average particle diameter ($d_{50}$) of from 100–800 nm,
the graft polymer d) having a rubber content of from 70–90% by weight.

As disclosed in DE 37 43 489 (U.S. Pat. No. 5,047,473, incorporated by reference) such polymer mixtures comprise: soft, flexible polymer mixtures of
a) 30–70 parts by weight of a graft polymer of a mixture of 25–40 parts by weight, in particular 30–40 parts by weight of acrylonitrile and 75–60 parts by weight, in particular 70 to 60 parts by weight of styrene, α-methylstyrene, alkyl methacrylate or mixtures thereof on particulate, highly cross-linked alkyl acrylate rubbers having an average particle diameter ($d_{50}$) of from 0.1 to 0.8 μm, with a total rubber content of 20–55% by weight, prepared with a graft yield greater than 25% by weight, preferably greater than 40% by weight,
b) 60–5 parts by weight of a graft polymer of
   b1. methyl methacrylate, optionally in combination with up to 30% by weight of styrene, acrylonitrile and/or alkyl acrylate or
   b2. a mixture of 20–40% by weight of acrylonitrile and 80–60% by weight of styrene, α-methylstyrene, alkyl methacrylate or mixtures thereof
on a particulate, highly cross-linked alkyl acrylate rubber having an average particle diameter ($d_{50}$) of from 0.1 to 0.8 μm, with a total rubber content of 65–90% by weight, and
c) 10–40 parts by weight of a partially cross-linked rubber-like copolymer of 5–40% by weight of acrylonitrile, styrene, alkylmethacrylate or mixtures thereof and 95–60% by weight of alkyl acrylate with a gel content of from 20 to 99% by weight and a swelling index greater than 10, determined in dimethylformamide at 23° C., and
d) optionally up to 6% by weight, in particular from 1–5% by weight, based on the total quantity of a+b+c, of a resinous polymer of at least 60% by weight of styrene, o-methylstyrene or alkyl methacrylate and up to 40% by weight of acrylonitrile or methacrylonitrile with a Staudinger index (in dimethylformamide at 25° C.) of from 2–10 dl/g in particular from 2.5–6 dl/g.

The films fabricated from these polymer mixtures have a high level of properties and good age resistance. They are used, for example, for the internal trims of motor vehicles. In spite of their good age resistance, also under the action of heat, compared with that of PVC-containing film moulding compounds hitherto commonly used, discolourations may occur in the films at high processing temperatures and/or after prolonged processing times, especially in the case of light colours, with the result that exact adjustment of the colour or exact reproduction of light colours becomes difficult. There was therefore a need for polymer mixtures having further improved thermostability and are free from the above-mentioned disadvantages.

It was found that the usual stabilizers for PVC and/or ABS moulding compounds, such as alkyl tin mercaptides or phenolic or aminic antioxidants, provide no improvement in age resistance in the above-mentioned polymer mixtures.

It was found, however, that special oxetanyl group-containing phosphites improve the thermostability of the above-mentioned polymer mixtures to such an extent that discolourations are greatly reduced, even at elevated processing temperatures and/or after prolonged processing times.

The present invention thus relates to polymer mixtures of acrylate graft rubbers, certain special acrylate copolymers and optionally resinous vinyl polymers, containing from 0.1 to 8% by weight, preferably from 0.5 to 6% by weight, of oxetanyl group-containing phosphites corresponding to formula (I) or (II)

$$P(OR)_3 \quad (I)$$

or

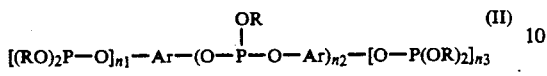

wherein
$n_1$ denotes 1 or 2,
$n_2$ denotes any integer from 0 to 2 and
$n_3$ denotes 1 or 2,
R denotes a group corresponding to the following formula

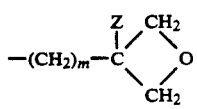

wherein
m=0 or 1 and
Z=H, $CH_3$, $C_2H_5$, n—$C_5H_{11}$, $CH_2$—$C_6H_5$, $CH_2$—O—$C_6H_5$ or $CH_2$—O—$C_2H_5$ and
Ar denotes the residue of a mononuclear divalent or trivalent phenol, the residue corresponding to the following formula:

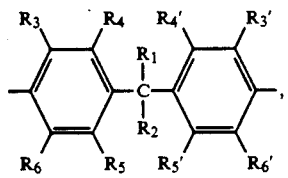

wherein
$R_1$ and $R_2$ are identical or different and denote H, $C_1$–$C_{18}$-alkyl, a mononuclear or polynuclear $C_3$–$C_6$-cycloalkyl or a mononuclear or poly-nuclear $C_6$–$C_8$-aryl, and wherein
$R_3$, $R_4$, $R_4'$, $R_5$, $R_5'$, $R_6$ and $R_6'$ are identical or different and denote H, $C_1$–$C_{18}$-alkyl, $C_1$–$C_{18}$-alkoxy or chlorine or bromine, or the residue of $\alpha,\alpha$-bis-(hydroxyphenyl)-diisopropylbenzene, wherein the Ar's may be identical or different from one another when $n_2 \neq 0$, or mixtures of the above-mentioned phosphites.

Compounds corresponding to formula (I) in which m=1 and Z=$CH_3$ or $C_2H_5$ are preferred, as are also those compounds corresponding to formula II in which m=1 and Z=$CH_3$ or $C_2H_5$ and, when Ar corresponds to formula (B), $R_1$=$R_2$=$CH_3$ and $R_3$—$R_6$=$R_3'$—$R_6'$=H and $n_1$=1, $n_2$=0 and $n_3$=1.

Compounds corresponding to formula (I) in which m=1 and Z=$CH_3$ or $C_2H_5$ are particularly preferred.

Polymer mixtures of acrylate graft rubbers, acrylate copolymers and optionally resinous vinyl polymers are described in DE-38 11 899 and DE-37 43 489, as already mentioned. The polymers of cyclic aliphatic esters and carbonates described in DE-38 41 669 and/or the carbonate group-containing polyesters described in DE-39 18405 may be added as further components to the polymer mixtures according to the invention.

The polymers disclosed in DE 38 41 669 comprise mixtures of:
a) 10 to 60, especially 20 to 50 parts by weight of a graft polymer of
   a1. mixtures of 20 to 40 percent by weight of acrylonitrile and 80 to 60 percent by weight of styrene, α-methyl styrene, alkyl methacrylate or mixtures thereof, or
   a2. methyl methacrylate, optionally mixed with up to 30 percent by weight of styrene, acrylonitrile and/or alkyl acrylate or
   a3. a particulate, highly crosslinked alkyl acrylate rubber which can have up to 30 percent by weight of dienes polymerized into it, with a mean particle diameter ($d_{50}$) of 80 to 800 nm, whereby the graft polymer (a) has a rubber content of 30 to 80 percent by weight, preferably 45 to 65 percent by weight, especially preferred 50 to 60 percent by weight,
b) 10 to 50, especially 10 to 40, parts by weight of a partially crosslinked, rubber-like copolymer consisting of 5 to 40 percent by weight of acrylonitrile, styrene, alkyl methacrylate or mixtures thereof and 95 to 60 percent by weight of alkyl acrylate with a gel content of 20 to 99 percent by weight, a swelling index greater than 10 (measured in dimethyl formamide at a temperature of 23° C. [73.4° F.]) and a mean particle diameter ($d_{50}$) of 100 to 600 nm, especially of 100 to 300 nm,
c) 5 to 40, especially 10 to 30, parts by weight of a non-crosslinked polymer consisting of styrenes, α-methyl styrenes, acrylonitrile, methacrylonitrile, esters of acrylic acid or methacrylic acid, vinyl-$C_1$-$C_4$-carboxylic acids or mixtures of these monomers with limiting viscosity indices (measured in dimethyl formamide at a temperature of 23° C. [73.4° F.]) of 0.3 to 1.5 dl/g and
d) 5 to 40, especially 8 to 30, parts by weight of a polymer consisting of a cyclical aliphatic ester or a copolymer consisting of a cyclical aliphatic ester and a cyclical aliphatic carbonate, whereby the weight ratio of ester to carbonate ranges from 98:2 to 40:60.

The carbonate group containing polyesters described in DE 39 18 405 (U.S. Pat. No. 5,096,966, incorporated by reference) comprise polymer mixtures of
a) 10 to 60, in particular 20 to 50 parts by weight of a graft polymer having a rubber content of 20 to 80 weight %, preferably 40 to 65 weight % and most preferably 50 to 60 weight % of
   a1. mixtures of 20 to 40 weight % of acrylonitrile and 80 to 60 weight % of styrenes and/or alkymethacrylates or
   a2. methylmethacrylate, optionally mixed with up to 30, preferably 2 to 20 weight % of styrenes and/or up to 30, preferably 2 to 20 weight % of alkylacrylates and/or up to 19, preferably 2 to 25 weight % of acrylonitrile, onto
   a3. a particle-type highly cross-linked alkylacrylate rubber which may contain copolymerized up to 30, preferably 0.5 to 10 weight %, of dienes, having an average particle diameter ($d_{50}$) of 80 to 1,000 nm,
b) 10 to 50, in particular 10 to 40 parts by weight of a partially cross-linking rubber-type copolymer made from 5 to 40, preferably 10 to 35 weight %, of acrylonitrile, styrene, alkylmethacrylate or mixtures thereof and 95 to 60, preferably 90 to 65 weight %, of alkylacrylate having a gel content of 20 to 99 weight %, a swelling index greater than 10, measured in dimethylformamide at 23° C., and an average particle diameter (d₅₀) of 100 to 600 nm, in particular 100 to 300 nm, c) 5 to 40, preferably 10 to 30 parts by weight of a non-crosslinked polymer of styrenes, acrylonitrile, methacrylonitrile, esters of (meth)acrylic acid, vinyl-$C_1$-$C_4$-carboxylic acids or mixtures of these monomers having Staudinger indices [η] (measured in dimethylformamide at 23° C.) of 0.3 to 1.5 dl/g, and d) 1 to 40, in particular 5 to 30 parts by weight of a polyester containing carbonate groups and having recurring structural units of the formula

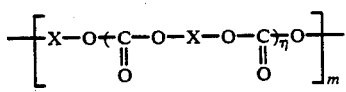

(I)

in which

X is the radical of a reaction product of a multivalent alcohol and a multivalent aliphatic carboxylic acid having a molecular weight of 800 to 5,000, X'=X or is the radical of an aliphatic polyether of molecular weight 800 to 5,000, n=0 or is a 1 to 20, and m denotes a number greater than 20, preferably 22 to 100.

Polymer mixtures containing the resinous vinyl polymers as third component are preferred.

The usual and known additives and processing auxiliaries may also be added in the known quantities to the polymer compositions according to the invention.

The polymer compositions according to the invention may be used inter alia for the fabrication of various types of films.

EXAMPLES

A polymer mixture (moulding compounds) is prepared according to DE-OS 3 811 899 from 45% by weight of an acrylate graft rubber described there (Component aI of the Examples), 40% by weight of a cross-linked butyl acrylate/acrylonitrile copolymer (Component b of the Examples) and 15% by weight of a styrene/acrylonitrile resin (Component c of the Examples). 5% by weight of polycaprolactone ($M_w$=40,000 g/mol), 3% by weight of titanium dioxide (Bayertitan R-FKD), 0.3% by weight of light blue 100 (Bayer AG), 0.3% by weight of Loxiol G70 (of Henkel) and the amounts of Component A1 and A2 mentioned in the Table are incorporated in this moulding compound on a roller. The thermostability is tested by rolling at 200° C. and assessed optically on the basis of any colour changes observed.

Component A1:

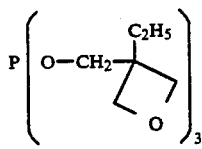

Component A2:

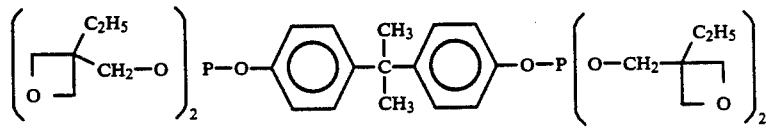

TABLE

Additions to the moulding compounds (in parts by weight, based on 100 parts by weight of the initial moulding compound)

| Example No. | Components/Parts by weight |
|---|---|
| 1 | A1/1 |
| 2 | A1/2 |
| 3 | A2/2 |
| 4 | A2/6 |

A comparison moulding compound is prepared analogously to Example 1 but without Component A1.

Whereas the comparison moulding compound underwent slight discolouration after only 10 minutes' rolling at 200° C. and severe discolouration from light blue to green after 20 minutes, the moulding compounds 1, 2 and 4 according to the invention showed virtually no discolouration after 10 minutes and only a slight greenish tinge after 20 minutes. A distinct green discolouration can be seen in the moulding compound of Example 3 after 20 minutes.

We claim:

1. Polymer mixtures of acrylate graft rubbers, certain special acrylate copolymers and optionally resinuous vinyl polymers, containing from 0.1 to 8% by weight of oxetanyl group-containing phosphites corresponding tot he following formula

(I)

or the formula

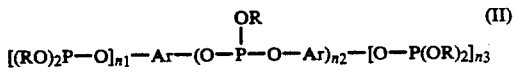

(II)

wherein $n_1$ denotes 1 or 2, $n_2$ denotes any integer from 0 to 2 and $n_3$ denotes 1 to 2, R denotes a group corresponding to the following formula

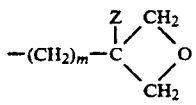

wherein
m=0 or 1 and
Z=H, CH$_3$, C$_2$H$_5$, n—C$_5$H$_{11}$, CH$_2$—C$_6$H$_5$, CH$_2$—O—C$_6$H$_5$ or CH$_2$—O—C$_2$H$_5$ and
Ar denotes the residue of a mononuclear divalent or trivalent phenol,
the residue corresponding to the following formula

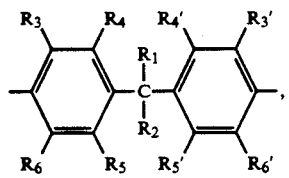 (B)

wherein
R$_1$ and R$_2$ are identical or different and denote H, C$_1$-C$_{18}$-alkyl, a mononuclear or polynuclear C$_3$-C$_6$-cycloalkyl or a mononuclear or polynuclear C$_6$-C$_{18}$-aryl, and wherein
R$_3$, R$_4$, R$_4'$, R$_5$, R$_5'$, R$_6$ and R$_6'$ are identical or different and
stand for H, C$_{1-18}$-alkyl, C$_1$-C$_{18}$-alkoxy or chlorine or bromine, or the residue of α, α-bis-(hydroxyphenyl)-diisopropylbenzene, and the Ar's may be identical to one another or differ when n$_2$≠0, or mixtures of the above-mentioned phosphites,
and wherein the polymer mixtures comprise either polymer mixtures of
a) from 10–60 parts by weight of a graft polymer comprising:
  a1. mixtures of from 20–40% by weight of acrylonitrile and 80–60% by weight of styrene, α-methylstyrene, alkylmethacrylate or mixtures thereof, or
  a2. methylmethacrylate, optionally mixed with up to 30% by weight of styrene, acrylonitrile and/or alkylacrylate, on
  a3. a particulate, highly cross-linked alkylacrylate rubber with an average particle diameter (d$_{50}$) of from 100 to 800 nm which may contain up to 30% by weight of dienes, the graft polymers (a) having rubber contents of from 30–70% by weight,
b) from 10–50 parts by weight of an at least partially cross-linked rubber-like copolymer of from 5–40% by weight of acrylonitrile, styrene, alkylmethacrylate or mixtures thereof and from 95–60% by weight of alkylacrylate and small amounts of a cross-linking monomer having a gel content of from 20–99% by weight, a swelling index above 10 determined in dimethylformamide at 23° C. and an average particle diameter (d$_{50}$) of from 100–600 nm,
c) from 5–80 parts by weight of an uncross-linked polymer of styrenes, α-methylstyrenes, acrylonitrile, methacrylonitrile, esters of (meth)acrylic acid, vinyl C$_1$-C$_4$-carboxylic acids or mixtures of these monomers having Staudinger indices of from 0.3 to 1.5 dl/g (determined in toluene at 23° C.); and
d) from 0–30, in particular from 5–25, parts by weight of a graft polymer comprising:
  d1. methylmethacrylate and optionally up to 30% by weight of styrene, acrylonitrile and/or alkylacrylate, or
  d2. a mixture of from 20–35% by weight of acrylonitrile and from 80–65% by weight of styrene, α-methylstyrene, alkylmethacrylate or mixtures thereof, on
  d3. a particulate, highly cross-linked alkylacrylate rubber which may contain up to 30% by weight of diene and has an average particle diameter (d$_{50}$) of from 100–800 nm,
the graft polymer (d) having a rubber content of from 70–90% by weight,
or polymer mixtures of
a) 30–70 parts by weight of a graft polymer of a mixture of 25–40 parts by weight of acrylonitrile and 75–60 parts by weight of styrene, α-methylstyrene, alkyl methacrylate or mixtures thereof on particulate, highly cross-linked alkyl acrylate rubbers having an average particle diameter (d$_{50}$) of from 0.1 to 0.8 μm, with a total rubber content of 20–55% by weight, prepared with a graft yield greater than 25% by weight, preferably greater than 40% by weight,
b) 60–5 parts by weight of a graft polymer of
  b1. methyl methacrylate, optionally in combination with up to 30% by weight of styrene, acrylonitrile and/or alkyl acrylate or
  b2. a mixture of 20–40% by weight of acrylonitrile and 80–60% by weight of styrene, α-methylstyrene, alkyl methacrylate or mixtures thereof
on a particulate, highly cross-linked alkyl acrylate rubber having an average particle diameter (d$_{50}$) of from 0.1 to 0.8 μm, with a total rubber content of 65–90% by weight, and
c) 10–40 parts by weight of a partially cross-linked rubber-like copolymer of 5–40% by weight of acrylonitrile, styrene, alkylmethacrylate or mixtures thereof and 95–60% by weight of alkyl acrylate with a gel content of from 20 to 99% by weight and a swelling index greater than 10, determined in dimethylformamide at 23° C., and
d) optionally up to 6% by weight, based on the total quantity of a+b+c, of a resinous polymer of at least 60% by weight of styrene, o-methylstyrene or alkyl methacrylate and up to 40% by weight of acrylonitrile or methacrylonitrile with a Staudinger index (in dimethylformamide at 25° C.) of from 2–10 dl/g.

2. Moulding compounds according to claim 1, characterised in that the oxetanyl group-containing phosphites have the structure (I).

* * * * *